United States Patent
Koga et al.

(10) Patent No.: US 11,715,873 B2
(45) Date of Patent: Aug. 1, 2023

(54) STRADDLE TYPE VEHICLE

(71) Applicant: HONDA MOTOR CO., LTD., Tokyo (JP)

(72) Inventors: Futoshi Koga, Wako (JP); Naoto Yamashita, Wako (JP); Akihito Kawamura, Wako (JP); Hiroshi Maeda, Wako (JP); Yoshiyuki Kuroba, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 438 days.

(21) Appl. No.: 17/098,789

(22) Filed: Nov. 16, 2020

(65) Prior Publication Data
US 2021/0061395 A1 Mar. 4, 2021

Related U.S. Application Data

(63) Continuation of application No. PCT/JP2018/019898, filed on May 23, 2018.

(51) Int. Cl.
*H01Q 1/32* (2006.01)
*B62J 45/41* (2020.01)
*B62J 17/02* (2006.01)
*B62J 50/21* (2020.01)
*B62J 6/022* (2020.01)
*B62J 40/00* (2020.01)

(52) U.S. Cl.
CPC ............ *H01Q 1/3291* (2013.01); *B62J 17/02* (2013.01); *B62J 45/41* (2020.02); *B62J 50/21* (2020.02); *B62J 6/022* (2020.02); *B62J 40/00* (2020.02)

(58) Field of Classification Search
CPC ....... H01Q 1/3291; H01Q 1/325; B62J 45/41; B62J 50/21; B62J 17/02; B62J 17/04; B62J 40/00; B62J 6/022
See application file for complete search history.

(56) References Cited

U.S. PATENT DOCUMENTS

| 4,606,571 A | 8/1986 | Fujita | |
|---|---|---|---|
| 4,707,017 A * | 11/1987 | Minobe | B62J 17/04 74/216.3 |
| 6,778,143 B2 * | 8/2004 | Morita | B60C 23/0444 343/702 |

(Continued)

FOREIGN PATENT DOCUMENTS

| CN | 106945755 A | 7/2017 |
|---|---|---|
| CN | 107826191 A | 3/2018 |

(Continued)

OTHER PUBLICATIONS

International Search Report and Written Opinion for PCT/JP2018/019898 dated Aug. 7, 2018.

(Continued)

*Primary Examiner* — Tony H Winner
*Assistant Examiner* — Michael R Stabley
(74) *Attorney, Agent, or Firm* — Thomas | Horstemeyer, LLP

(57) ABSTRACT

The straddle type vehicle comprises an antenna that can receive a wireless signal of a predetermined frequency band, and a sensing unit for sensing a situation in front of the vehicle. A constituent component of the vehicle is arranged between the antenna and the sensing unit.

9 Claims, 9 Drawing Sheets

(56) References Cited

U.S. PATENT DOCUMENTS

| | | | |
|---|---|---|---|
| 7,362,278 B2 * | 4/2008 | Funayose | B62J 50/225 |
| | | | 701/487 |
| 7,812,559 B2 | 10/2010 | Tsuda | |
| 9,893,415 B2 | 2/2018 | Hashimoto | |
| 10,166,909 B2 | 1/2019 | Suzuki et al. | |
| 10,562,477 B2 | 2/2020 | Fuchs et al. | |
| 10,742,933 B2 * | 8/2020 | Noguchi | G01S 19/24 |
| 2002/0003501 A1 * | 1/2002 | Kushida | B62J 17/02 |
| | | | 343/721 |
| 2008/0236922 A1 | 10/2008 | Tsuda | |
| 2016/0013545 A1 | 1/2016 | Hashimoto | |
| 2016/0241816 A1 * | 8/2016 | Noguchi | B62J 50/22 |
| 2017/0327026 A1 | 11/2017 | Suzuki et al. | |
| 2017/0327177 A1 * | 11/2017 | Mizuno | B62K 23/02 |
| 2019/0161042 A1 | 5/2019 | Fuchs et al. | |
| 2020/0369340 A1 * | 11/2020 | Ku | B62J 50/22 |

FOREIGN PATENT DOCUMENTS

| | | |
|---|---|---|
| JP | 2008110683 A | 5/2008 |
| JP | 2008247185 A | 10/2008 |
| JP | 2011225160 A | 11/2011 |
| JP | 2016016773 A | 2/2016 |
| JP | 2017-039487 A | 2/2017 |
| JP | 2017202810 A | 11/2017 |
| WO | 2014136658 A1 | 9/2014 |
| WO | 2017221410 A1 | 12/2017 |
| WO | 2019224960 A1 | 11/2019 |

OTHER PUBLICATIONS

IPRP for PCT/JP2018/019898 dated Apr. 2, 2020.
German Office Action for German Patent Application No. 112018007650.4 dated Dec. 16, 2022 (partially translated).
Chinese Office Action for Chines Patent Application No. 201880093357.5 dated Jun. 18, 2021 (partially translated).

* cited by examiner

STRADDLE TYPE VEHICLE

CROSS-REFERENCE TO RELATED APPLICATION

This application is a continuation of International Patent Application No. PCT/JP2018/019898 filed on May 23, 2018 the entire disclosure of which is incorporated herein by reference.

BACKGROUND OF THE INVENTION

Field of the Invention

The present invention relates to the straddle type vehicle with a communication function and a sensing function.

Description of the Related Art

PTL1 discloses a straddle type vehicle on which antennas for communication are arranged in a front and a rear of the vehicle, and that obtains information of the periphery of the vehicle by road-to-vehicle communication and vehicle-to-vehicle communication.

CITATION LIST

Patent Literature

PTL1: International Publication No 2014/136658

SUMMARY OF INVENTION

Technical Problem

In a case where antennas for communication and a sensing unit for sensing a situation in the periphery of the vehicle are used in combination, it is necessary to arrange the antennas so as to accord with the directionality of the antennas in order to ensure a broad communication range. Also, it is necessary to reduce the influence of metallic occluding objects that block electromagnetic waves and to arrange the antennas and sensing unit so as to be separated so as to suppress electromagnetic wave interference between them.

The present invention provides a straddle type vehicle in which an antenna and a sensing unit are arranged so while according to the directionality of the antennas, the influence of metallic occluding objects is reduced, and electromagnetic wave interference is suppressed.

Solution to Problem

A straddle type vehicle of one embodiment of the present invention comprising an antenna capable of receiving a wireless signal of a predetermined frequency band; and a sensing unit for sensing a situation in a front direction of the vehicle, wherein a constituent component of the vehicle is arranged between the antenna and the sensing unit, and the sensing unit is supported by a main frame that extends in a longitudinal direction of a vehicle via a support stay, and is arranged more in the front direction of the vehicle than the antenna and the constituent component.

Advantageous Effects of Invention

By virtue of the present invention, a straddle type vehicle in which an antenna and a sensing unit are arranged so that while according to the directionality of the antenna, the influence of metallic occluding objects is reduced, and electromagnetic wave interference is suppressed can be provided.

Further features of the present invention will become apparent from the following description of exemplary embodiments (with reference to the attached drawings).

DESCRIPTION OF THE EMBODIMENTS

Embodiment 1

An embodiment of the present invention will be described below with reference to the figures. The components mentioned in this embodiment are merely illustrations, and are not limited by the following embodiments. In each drawing, arrows X, Y, and Z indicate directions perpendicular to each other, and the X direction indicates the front-and-rear direction of a motorcycle (a straddle type vehicle), the Y direction indicates the vehicle width direction (left-and-right direction) of the straddle type vehicle, and the Z direction indicates the vertical direction. The left and right of the straddle type vehicle are the left and right in the traveling direction. The front or rear in the front-and-rear direction of the straddle type vehicle will simply be called the front or rear in some cases. Also, the inside or outside in the vehicle width direction (left-and-right direction) of the straddle type vehicle will simply be called the inside or outside in some cases.

Overview of Straddle Type Vehicle

Figure 1:
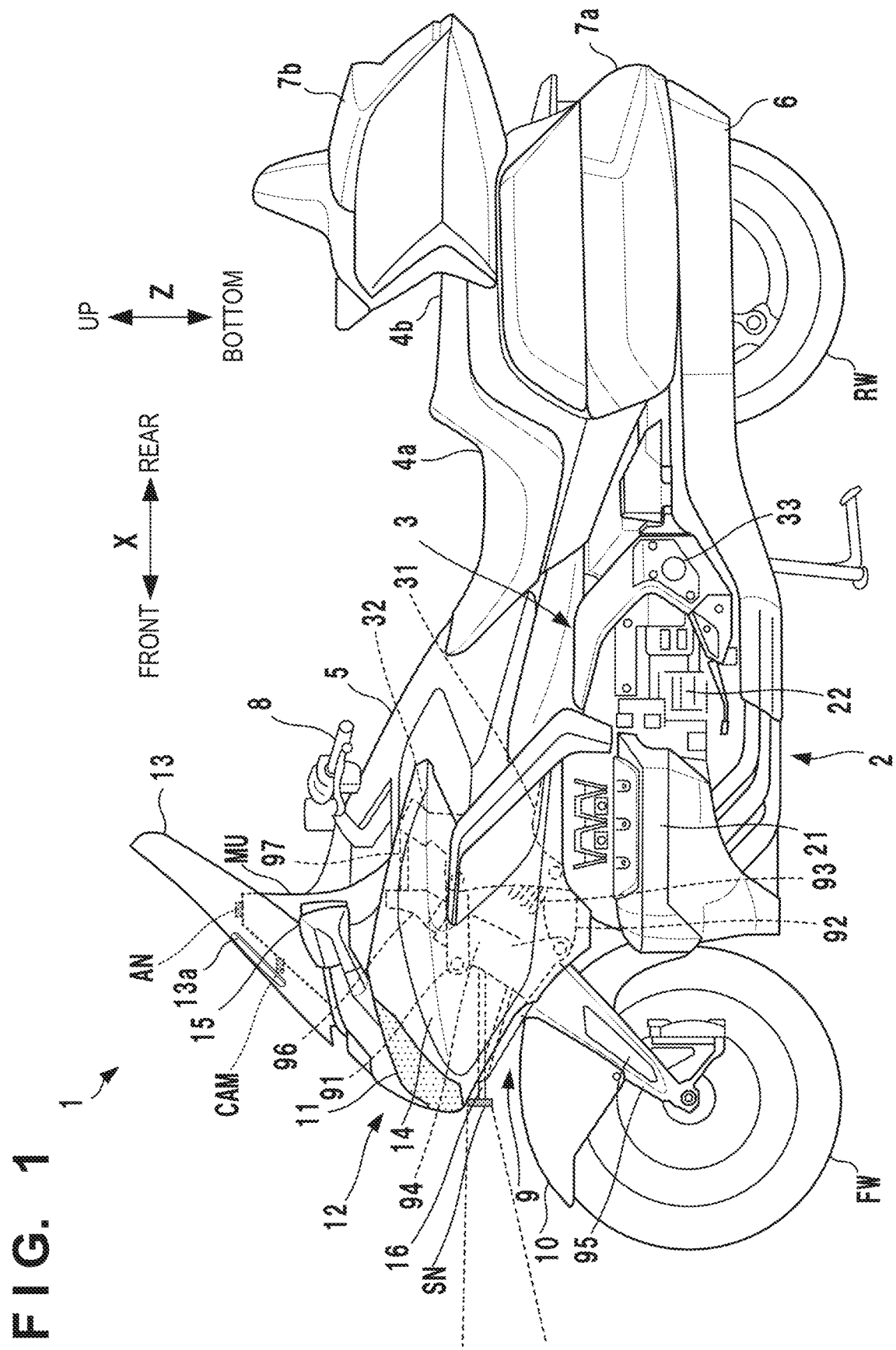
FIG. 1 is a left side view of a straddle type vehicle according to an embodiment of the present invention.
Figure 2:
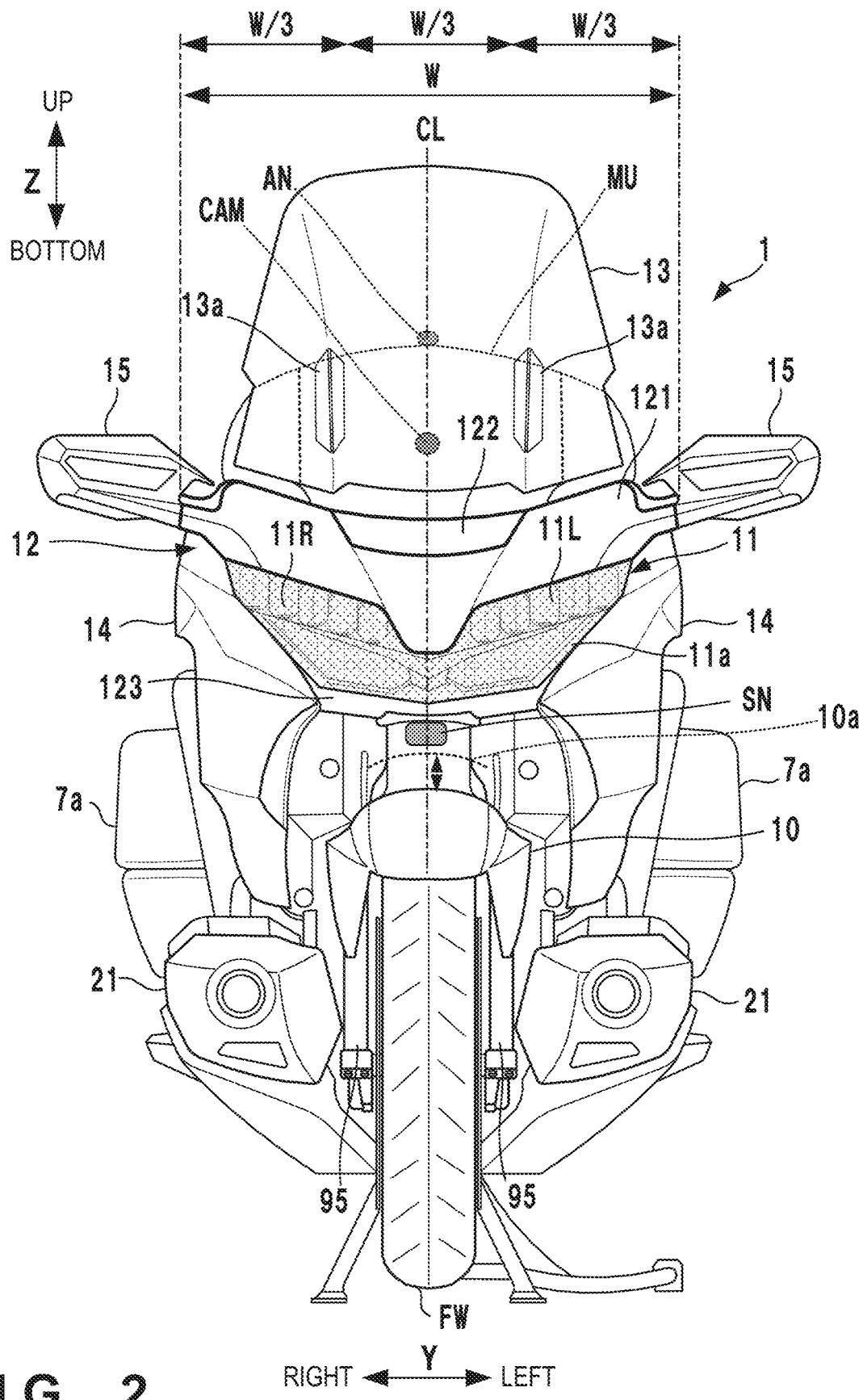
FIG. 2 is a front view of the straddle type vehicle shown in FIG. 1.

FIG. 1 is a side view of the left side of a straddle type vehicle 1 according to the embodiment of the present invention, and FIG. 2 is a front view of the straddle type vehicle 1. The straddle type vehicle 1 is a tourer-type motorcycle, which is suitable for a long-distance travel, but it should be noted that the present invention is also applicable to various straddle type vehicles including the other types of motorcycles, and is also applicable not only to vehicles whose driving sources are an internal combustion engine, but also to electric vehicles whose driving source is a motor. In the following description, the straddle type vehicle 1 will sometimes be called vehicle 1.

The vehicle 1 includes a power unit 2 between a front wheel FW and a rear wheel RW. In this embodiment, the power unit 2 includes a flat-six engine 21 and a transmission 22. The driving force of the transmission 22 is transmitted to the rear wheel RW via a drive shaft (not shown) and rotates the rear wheel RW.

The power unit 2 is supported by a vehicle frame 3. The vehicle frame 3 includes a pair of left and right main frames 31 extended in the X direction. A fuel tank 5 and an air cleaner box (not shown) are arranged above the main frames 31. A meter unit MU for displaying various kinds of information to the rider is installed in front of the fuel tank 5.

A head pipe 32 that pivotably supports a steering shaft (not shown) pivoted by a handle 8 is arranged on the front end portion of the main frames 31. A pair of left and right pivot plates 33 are attached to the rear end portions of the main frames 31. The lower end portion of the pivot plates 33 and the front end portion of the main frames 31 are connected by a pair of left and right lower arms (not shown), and the power unit 2 is supposed by the main frames 31 and the lower arms. A pair of left and right seat rails extending to the rear are arranged on the rear end portion of the main frames 31, and a seat 4a that the rider sits on or a seat 4b that a passenger sits on a rear trunk 7b, and the like are supported by the seat rail.

A front end portion of a rear swing arm (not shown) extending in the front-and-rear direction are swingably supported by the pivot plates 33. The rear swing arm is vertically swingable, and its rear end portion supports the rear wheel RW. An exhaust muffler 6 for silencing the exhaust gas of the engine 21 extends in the X direction in the lower side portion of the rear wheel RW. Left and right saddlebags 7a are formed on the upper side portions of the rear wheel RW.

A front suspension mechanism 9 for swingably supporting a front wheel FW is configured on the front end portion of the main frames 31. The front suspension mechanism 9 includes an upper link 91, a lower link 92, a fork support member 93, a cushion unit 94, and a pair of left and right front forks 95. In the suspension mechanism 9, the upper link 91, the lower link 92, the fork support member 93, and the cushion unit 94 configure a support mechanism that supports the front forks 95 of the vehicle 1.

The upper link 91 and the lower link 92 are vertically arranged on the front end portion of each main frame 31. Each rear end portion of the upper link 91 and the lower link 92 are swingably connected to the front end portion of the main frames 31. The upper link 91 and the lower link 92 are swingably connected to the fork support member 93. The cushion unit 94 has a structure in which a shock absorber is inserted through a coil spring and the upper end portion thereof is swingably supported by the main frames 31. The lower end portion of the cushion unit 94 is swingably supported by the lower link 92.

The fork support member 93 has a tubular shape and tilts backwards. A steering shaft 96 is rotatably supported around the fork support member 93. The steering shaft 96 has a shaft portion (not shown) inserted into the fork support member 93. A bridge (not shown) is formed in the lower end portion of the steering shaft 96, and supports the pair of left and right front forks 95. The front forks 95 rotatably support the front wheel FW. The upper end portion of the steering shaft 96 is connected to a steerable shaft (not shown) that is pivoted by the handle 8, via a link 97. When the handle 8 is steered, the steering shaft 96 rotates and steers the front wheel FW. The upper portion of the front wheel FW is covered with a fender 10, and the fender 10 is supported by the front forks 95.

Front Portion Structure

Figure 3:
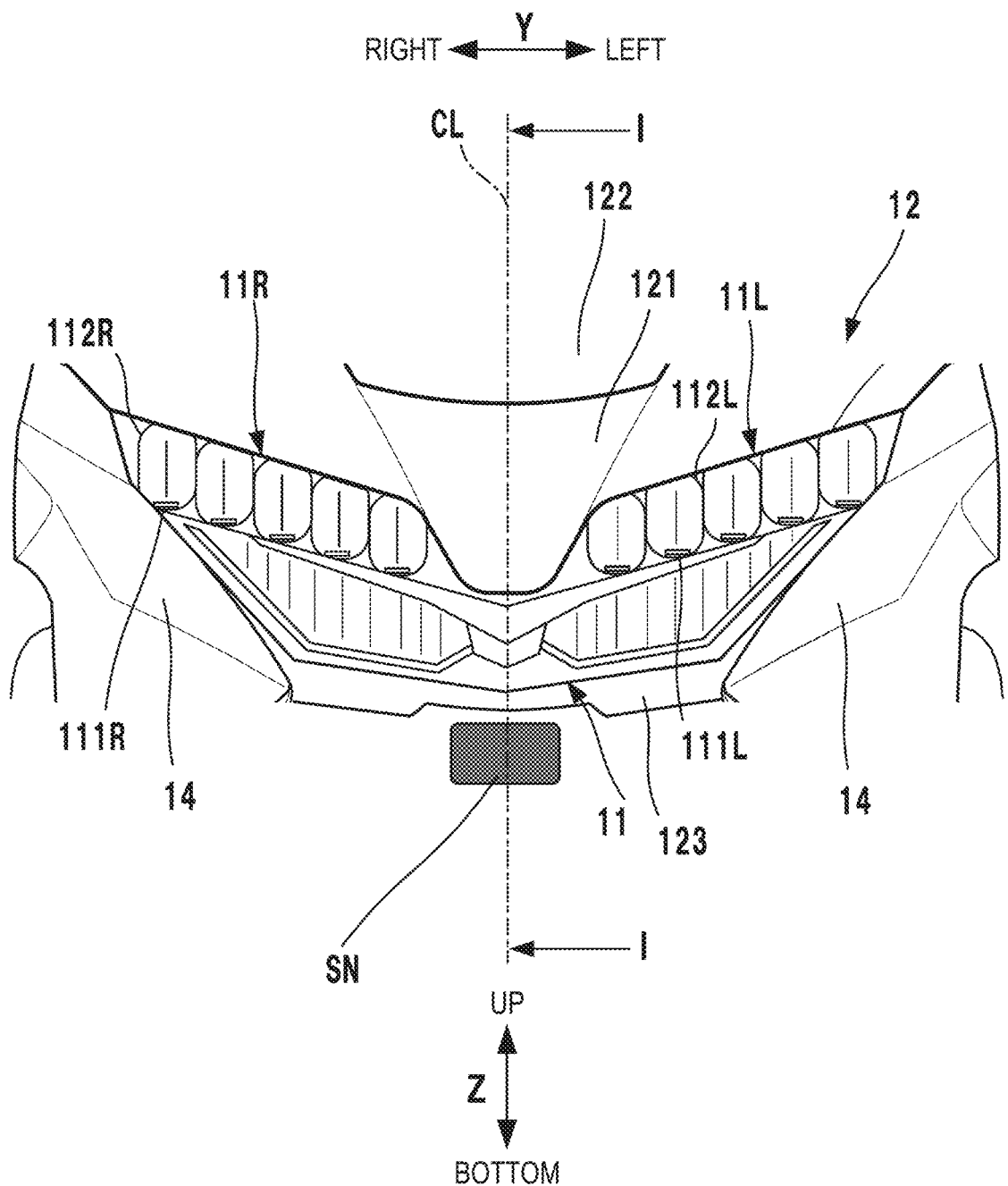
FIG. 3 is a magnification view of a periphery of a headlight unit.
Figure 4:
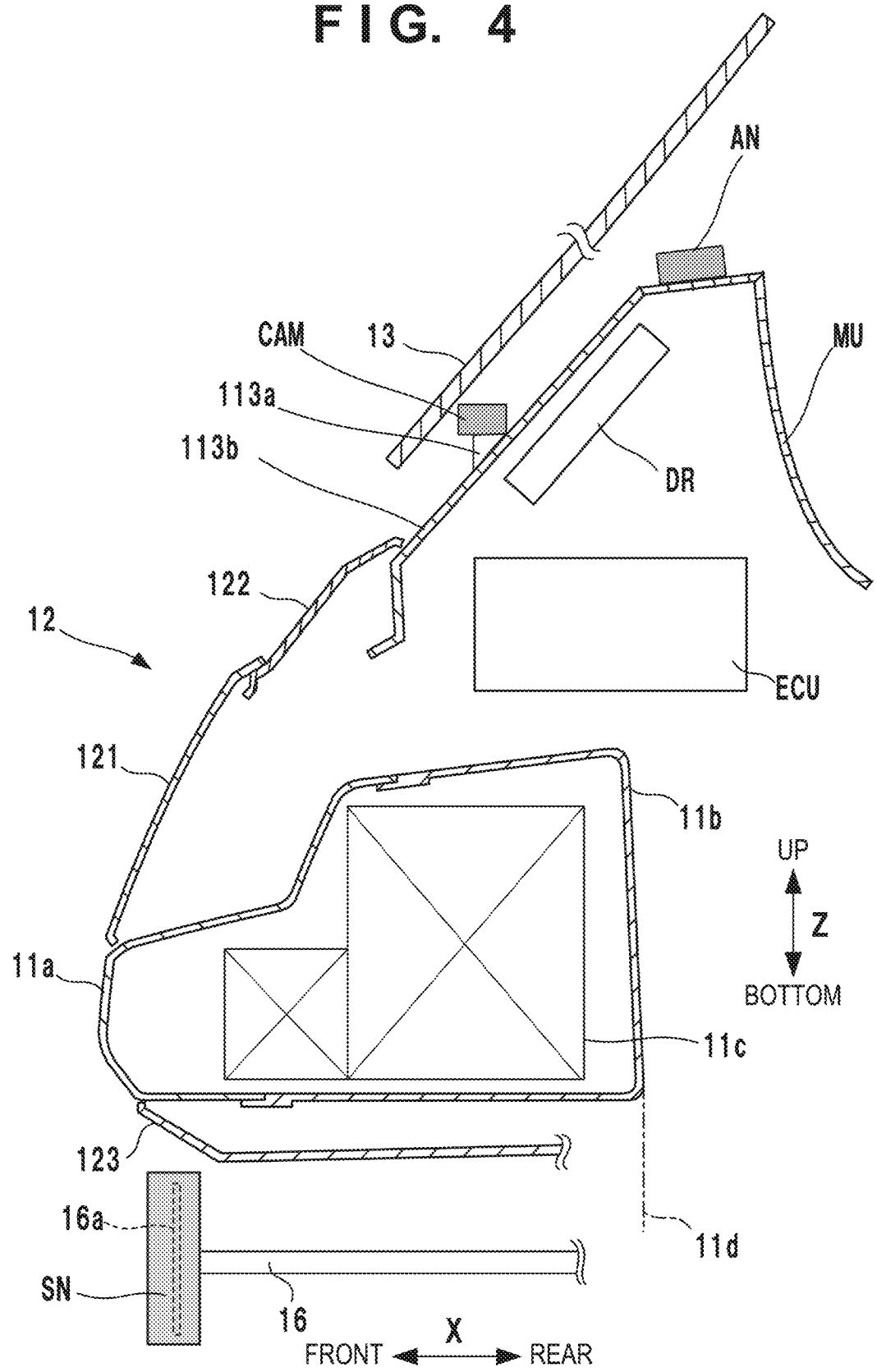
FIG. 4 is an overview cross-sectional view in a front structure of the straddle type vehicle.

The front structure of the vehicle 1 will be explained with reference to FIGS. 1 to 4. FIG. 3 is a magnification view of the periphery of a headlight unit 11 of the vehicle 1, and FIG. 4 is an overview cross-sectional view of the front portion structure of the vehicle 1 along the central line CL. The headlight unit 11 for emitting light in a front direction of the vehicle 1 is arranged in the front part of the vehicle 1. The headlight unit 11 of this embodiment is a two-lamp headlight unit that symmetrically includes a right-side light emitting portion 11R and a left-side light entitling portion ML.

A plurality of pairs (five pairs in the illustrated example) of light sources 111R and reflectors 112R are arranged in the light emitting portion 11R. The light source 111R is a light emitting element such as an LED. The reflector 112R is formed to surround the light source 111R from behind the light source 111R, and reflects light emitted by the light source 111R a front direction of the vehicle 1.

The light emitting portion 11L has the same arrangement as that of the light emitting portion 11R, and includes a plurality of pairs (five pairs in this example shown in the drawing) of light sources 111L and reflectors 112L. The light source 111L is a light emitting element such as an LED. The reflector 112L is formed to surround the light source 111L from behind the light source 111L, and reflects light emitted by the light source 111L in a front direction of the vehicle 1. A metal-plating process is applied to the surfaces of the reflector 112R and the reflector 112L in order to increase the reflectance of light, and light of the light source 111R and the light source 111L is reflected by the surface of the reflector 112R and the reflector 112L and is radiated in a front direction of the vehicle 1.

A lens member 11a is arranged in front of the headlight unit 11. The lens member 11a is formed by a transparent resin or the like. The lens member 11a of the present embodiment is a member arranged so as to cover both of the light emitting portion 11R and the light emitting portion 11L. The exterior of the headlight unit 11 is formed by the lens member 11a and a housing 11b, and an electrical circuit 11c schematically shown in FIG. 4 is arranged in the internal space. The electrical circuit 11c includes the above-described reflectors 112R and 112L and the light sources 111R and 111L, a driving circuit, and the like.

The front part of the vehicle 1 is covered with a front cover 12, and the front side parts of the vehicle 1 are covered with a pair of left and right side covers 14. A screen 13 is arranged to be supported by a screen stay 13a above the front cover 12. The screen 13 is a windshield for reducing the wind pressure that the rider receives during traveling, and is formed by, for example, a transparent resin member. In the meter unit MU on the front of the vehicle 1, a driving unit DR for driving the screen 13 and an electric control unit (ECU) are arranged. The driving unit DR has a motor that is a driving source for up-and-down movement driving of the screen 13 and has an electrical circuit for controlling the motor. Also, the electric control unit (ECU), based on information obtained by the later-described antenna AN, a sensing unit SN, and camera CAM, can perform notification of periphery information corresponding to a rider and can perform driving assistance control.

A pair of left and right side mirror units 15 are arranged on the sides of the front cover 12. The side mirror units 15 support side mirrors (not shown) by which the rider visually confirms the situation in the rear of the vehicle.

The front cover 12 includes cowl members 121 to 123, and the cowl members 121 to 123 form a front cowl. The cowl member 121 extends in the Y direction and forms the main body of the front cover 12, and the cowl member 122 forms a portion above the cowl member 121. A cowl member 123 configures a portion on the bottom side of the cowl member 121, are is arranged to be separated from the cowl member 121 in the downward direction.

Between the cowl member 121 and the cowl member 123 and between the left and right pair of side covers 14, an opening exposing the headlight unit 11 is formed, and the upper edge of this opening is defined by the cowl member 121, and the lower edge is defined by the cowl member 123, and the left and right side edges are defined by the side covers 14.

The vehicle 1 of this embodiment comprises the antenna AN, which is able to receive wireless signals in a predetermined frequency band, the sensing unit SN, which senses a situation in front of the vehicle, and a constituent component of the vehicle 1 is arranged between the antenna AN and the sensing unit SN.

The antenna AN functions as a communication unit for obtaining external information by communication, and by obtaining traffic information by communication with a communication server apparatus C-ITS-SV on a network and vehicle-to-vehicle communication with peripheral vehicles, obtains sensing information for obstacles in the periphery of the straddle type vehicle 1 and peripheral vehicles. The communication server apparatus C-ITS-SV can distribute road traffic information collected from infrastructure facilities arranged on the road, and the antenna AN, based on the road traffic information distributed from the communication server apparatus C-ITS-SV, can sense the distance between the straddle type vehicle 1 and a peripheral obstacle or a peripheral vehicle (relative distance), a speed of a peripheral vehicle (relative speed), and the like.

The antenna AN, in order to be able to, as much as possible, enlarge the communication range of highly directional electromagnetic waves that may be influenced by the peripheral situation, is arranged at a position where metallic occluding objects that may block electromagnetic waves are not arranged in front of or above the antenna AN. Also, so that interference between electromagnetic waves in the sensing unit SN described later and electromagnetic waves in the antenna AN does not occur, the vehicle 1 of this embodiment is configured to arrange the constituent component of the vehicle 1 between the antenna AN and the sensing unit SN, and to arrange the antenna AN and the sensing unit SN to be separated.

In FIG. 1 and FIG. 2, the screen stay 13*a* for supporting the screen 13 is configured by a resin or the like, for example. In such a case, the antenna AN can be arranged on the upper portion of the meter unit MU, for example. By arranging the antenna AN at this position, it is possible to achieve a good communication environment without the influence of metallic occluding objects in front of or above the antenna AN.

Figure 5:
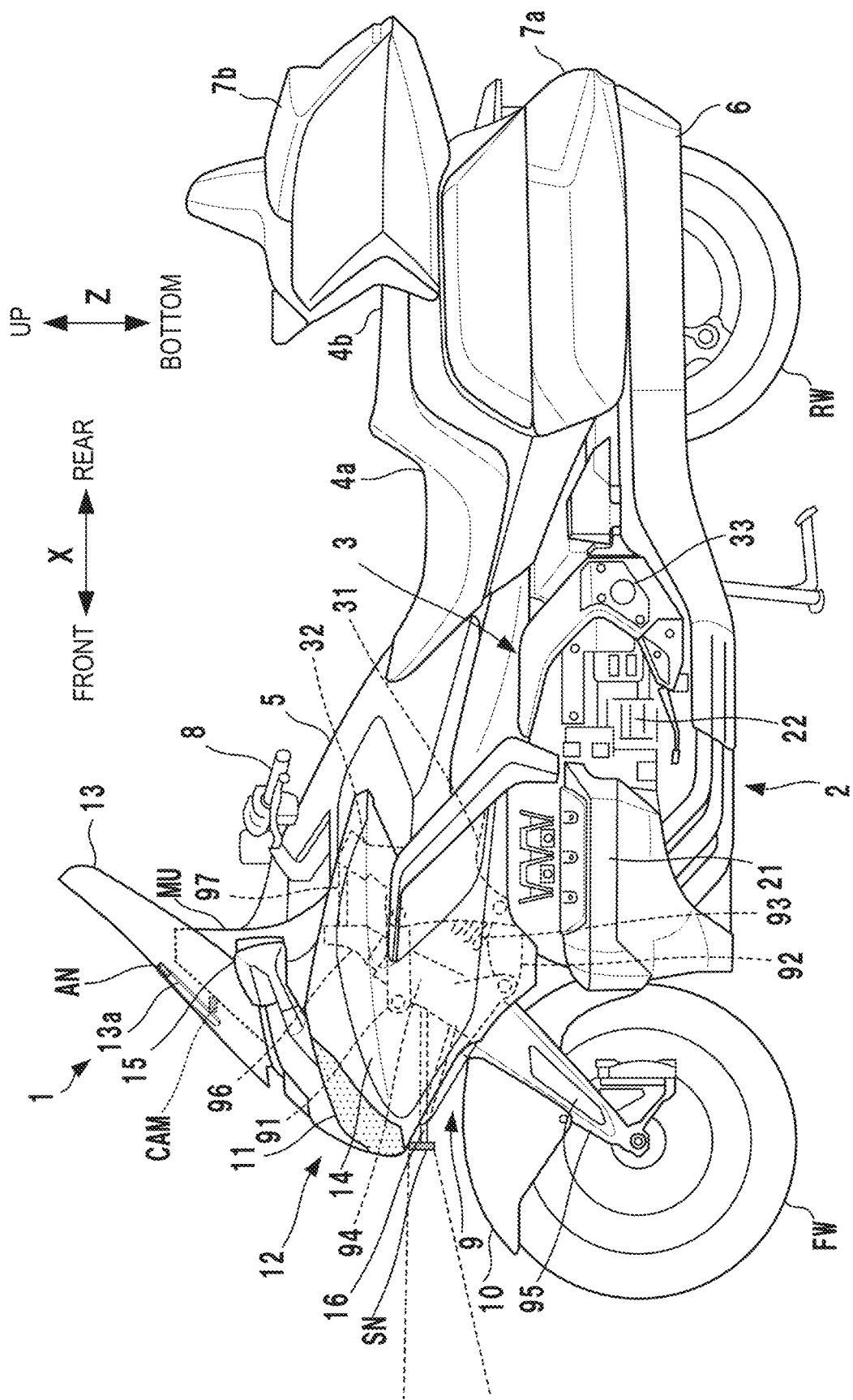
FIG. 5 is a left side view of the straddle type vehicle illustrating a variation of an arrangement of an antenna.
Figure 6:
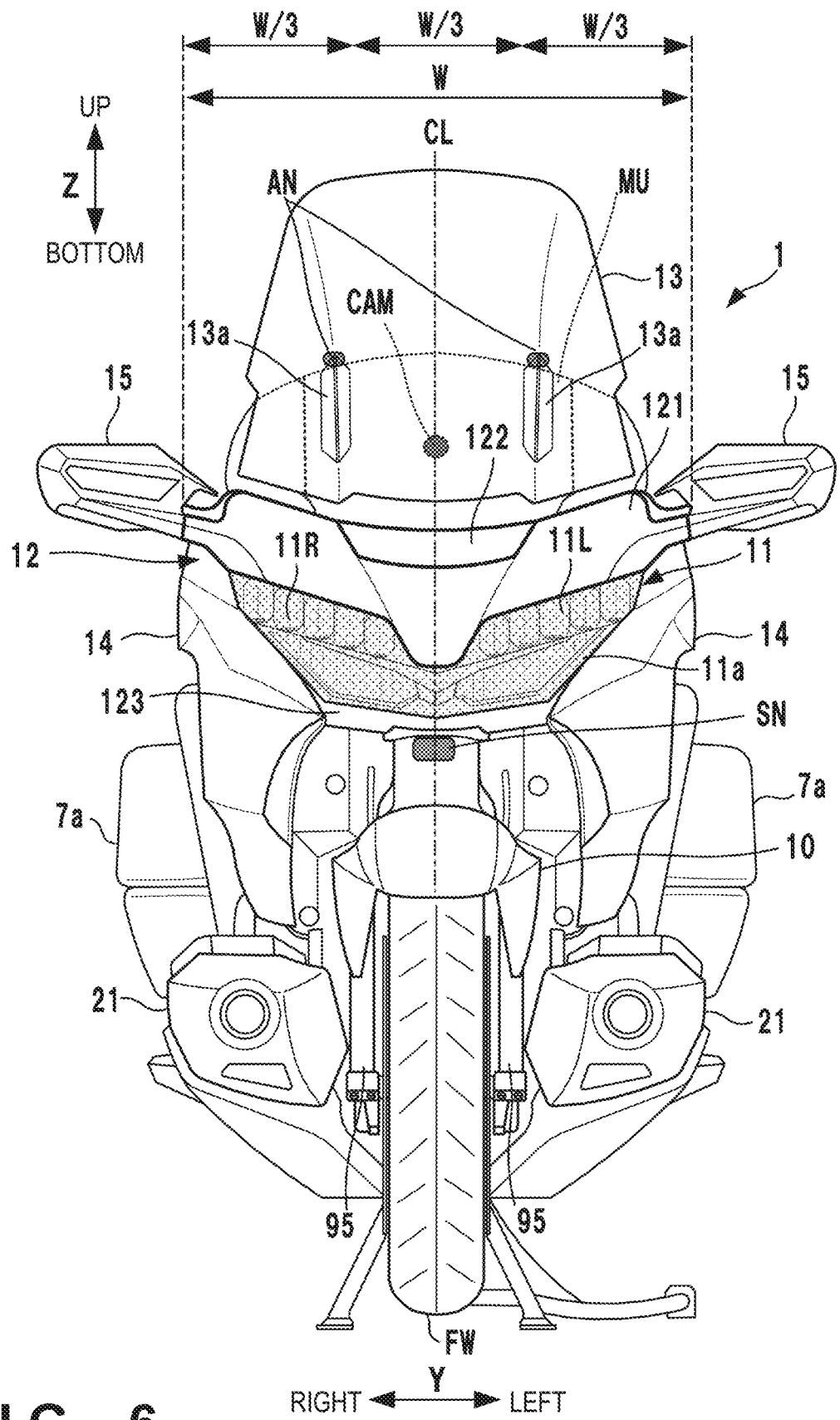
FIG. 6 is a front view of the straddle type vehicle of FIG. 5 illustrating a variation of an arrangement of an antenna.

Also, in the case where the screen stay 13*a* is configured by metal, for example, as illustrated in FIG. 5 and FIG. 6, it is possible to arrange the antenna AN above the screen stay 13*a*. By arranging the antenna AN at this position, it is possible to achieve a good communication environment without the influence of metallic occluding objects in front of or above the antenna AN. Note that as examples of arrangement of the antenna AN, in the examples of FIG. 5 and FIG. 6, an example in which two antennas AN are arranged above the screen stay 13*a* is shown, but it is sufficient that an antenna AN be arranged on at least one side.

The sensing unit SN is, for example, a millimeter-wave radar, and transmits radio waves and receives radio waves reflected by obstacles and peripheral vehicles. By this, vehicles n the periphery of the straddle type vehicle 1 and the like are sensed, and it is possible to sense the distance (relative distance) to the peripheral vehicles and the like and the speed (relative speed) of the peripheral vehicles and the like. In this embodiment, the sensing unit SN is arranged in a front direction and a downward direction of the vehicle 1 in relation to the antenna AN.

The sensing unit SN has a signal transceiver unit in it and an electrical circuit 16*a* also. When a metal part that is an obstruction to propagation of electromagnetic waves is arranged in the front of the sensing unit SN, there are cases where sensing accuracy suffers, and so the sensing unit SN is arranged at a position where a metallic occluding object has not been arranged. By arranging the sensing unit SN at such a position, it is possible to achieve a good sensing environment for the sensing unit SN. The sensing unit SN, in addition to a millimeter-wave radar, encompasses, for example, a laser radar (so-called LiDAR (Light Detection And Ranging)). As a configuration of the sensing unit SN, a millimeter-wave radar and a laser radar may be used in combination.

The vehicle 1 comprises the vehicle frame 3 including the main frames 31 which extend in the longitudinal direction of a vehicle, and the sensing unit SN, by a support stay 16, is supported on the main frames 31, and is arranged at a position in the downward direction of the front cover 12 (the cowl member 123). In the case of this embodiment, the main constituent component of the front cover 12 is formed by a resin material through which electromagnetic waves can transmit, and so by arranging the sensing unit SN at this position, it is possible to achieve a good sensing environment for the sensing unit SN.

The sensing unit SN, as illustrated in FIG. 2, is arranged at a central lower portion in the Y direction of the front cover 12. Such an arrangement may be, for example, an arrangement of the sensing unit SN such that the center in the Y direction of the sensing unit SN is positioned within the central range W/3 in the case where the width W is divided equally into three parts in the Y direction of the front cover 12 in FIG. 2. In the case of this embodiment, in particular, the sensing unit SN is arranged on a central line CL in the Y direction of the front cover 12. In this embodiment, the central line CL is also the central line of the vehicle 1 in the Y direction.

By arranging the sensing unit SN at the central lower portion in the Y direction of the front cover 12, it is possible to achieve a wide sensing range horizontally in the front direction of the vehicle 1, and it is possible to sense the situation in the front direction of the vehicle 1 with less overlooking of things. Also, since it is possible to monitor the front direction of the vehicle 1 equally in the horizontal by a single sensing unit SN, it is particularly advantageous in a configuration that only arranges one sensing unit SN rather than a plurality thereof.

Regarding the vertical direction (the Z direction) of the vehicle 1, the sensing unit SN is arranged at a position at which there is no interference with the fender 10 even in a state in which the front suspension mechanism 9 of the vehicle 1 has sunk down fully to the bottom position. The front suspension mechanism 9 that supports the front wheel FW swingably is configured in the vehicle 1, and when the vehicle 1 passes through a level difference in the road surface, the position of the fender 10 of the front wheel FW, by the sinking of the front suspension mechanism 9, rises until the upper-limit position 10a of the swinging of the fender 10 indicated by the dashed line, and can approach the sensing unit SN. By arranging the sensing unit SN at a position where interference with the fender 10 (the front wheel FW) does not occur even if the vehicle 1 travels in the state in which it is sunk down fully to the bottom position, the vehicle 1 can ensure the sensing performance of the sensing unit SN without being influenced by the travel environment such as the road surface conditions where the vehicle 1 is traveling.

Also, as illustrated in FIG. 4, since the sensing unit SN is positioned more on the front side in the X direction than the rear end 11d of the headlight unit 11, it is possible to avoid, in the sensing range of the sensing unit SN, electrical interference that may occur with metal parts present in the headlight unit 11 such as the reflectors 112R and 112L and the like to which a metal plating process has been applied. In terms of avoiding interference between metal parts and the sensing range of the sensing unit SN, the sensing unit SN is supported so as to be positioned as much as possible on the front side of the headlight unit 11.

In the case of this embodiment, the sensing unit SN is supported by the main frames 31. The main frames 31 are highly rigid members even within the vehicle frame 3, and so it is possible to improve the rigidity of support of the sensing unit SN by having a structure that supports the sensing unit SN in the main frames 31, and it is possible to suppress sensing range deviation by using the vehicle 1. The sensing unit SN may directly attach to the main frames 31, and in the case of such a configuration, the degree of freedom in arrangement of the sensing unit SN may suffer, and the degree of freedom in the shape of the main frames 31 may suffer. Accordingly, in this embodiment, the sensing unit SN is supported by the main frames 31 via the support stay 16.

Also, the sensing unit SN is arranged so as to be separated front the front cover 12. In the case of the example of FIG. 4, the sensing unit SN is arranged to be separated from the lower end of the front cover 12 (the cowl member 123), and a gap is formed between the sensing unit SN and the cowl member 123. An elastic member for absorbing shock such as a rubber or a sponge or the like is arranged in the gap. By the sensing unit SN being arranged to be separated from the front cover 12 (the cowl member 123), vibration in the front cover 12 tends not to propagate to the sensing unit SN, it is possible to prevent the mounting position of the sensing unit SN deviating due to vibration from the front cover 12, and it is possible to prevent the orientation of the sensing surface changing.

In this embodiment, the camera CAM, which is for capturing the situation in the periphery of the vehicle, is a camera (an imaging capturing apparatus) having a CCD image sensor or a CMOS image sensor, for example, and the camera CAM, by a mounting member 113a, is attached on a panel 113b that configures the meter unit MU. As illustrated in FIG. 4, the camera CAM is arranged at a position in the X direction between the meter unit MU and the screen 13. By arranging the camera CAM inside of the screen 13, it is possible to prevent dirtying of the image capturing lens of the camera CAM. Also, the camera CAM is arranged at a position between the sensing unit SN and the antenna AN in the vertical (Z direction) direction of the vehicle 1.

As illustrated in FIG. 2, the camera CAM is arranged in the center of the Y direction of the front cover 12. By arranging the camera CAM in the center of the Y direction of the front cover 12, it is possible to achieve a wider image capturing range horizontally in the front direction of the vehicle 1, and it is possible to better capture the situation in the front direction of the vehicle 1 without overlooking anything.

Also, because it is possible to monitor the front direction of the vehicle 1 equally in the horizontal by a single camera, it is particularly advantageous in a configuration in which only one camera is arranged rather than a plurality of cameras. In the case of using a plurality of cameras, it may become necessary to perform image processing on the plurality of captured images, but by capturing with a single camera arranged in the center of the Y direction, while the processing load when performing image processing is reduced, it is possible to obtain tin image with a wider image capturing range in the front direction of the vehicle 1.

In the arrangement relationship between the antenna AN and the sensing unit SN illustrated in FIG. 1 to FIG. 4, assuming the meter unit MU arranged above the front cover 12 (the front cowl) to be the constituent component of the vehicle, the antenna AN is arranged above the meter unit MU, and the sensing unit SN is arranged below the meter unit MU. By arranging the meter unit MU of the vehicle 1 between the sensing unit SN and the antenna AN and separating the sensing unit SN and the antenna AN, it is possible to suppress mutual interference of electromagnetic waves, and it becomes possible to ensure the communication performance of the antenna AN and sensing performance of the sensing unit SN.

Also, when the headlight unit 11 is assumed to be the constituent component of the vehicle, the antenna AN is arranged above the headlight unit 11, and the sensing unit SN is arranged below the headlight unit 11. By arranging the headlight unit 11 of the vehicle 1 between the sensing unit SN and the antenna AN and separating the sensing unit SN and the antenna AN, it is possible to suppress mutual interference of electromagnetic waves, and it becomes possible to ensure the communication performance of the antenna AN and sensing performance of the sensing unit SN.

Also, when the constituent component of the vehicle is assumed to be the driving unit DR for the screen 13 arranged above the front cover 12 (the front cowl), the antenna AN is arranged above the driving unit DR and the sensing unit SN is arranged below the driving unit DR. By arranging the driving unit DR, which is for driving the screen 13, between the sensing unit SN and the antenna AN and separating the sensing unit SN and the antenna AN, it is possible to suppress mutual interference of electromagnetic waves, and it becomes possible to ensure the communication performance of the antenna AN and sensing performance of the sensing unit SN.

Note that the constituent component of the vehicle is not limited to these examples, and may be an electric control unit (ECU). In such a case, the antenna AN is arranged above an electric control unit (ECU), and the sensing unit SN is arranged below the electric control unit (ECU).

By arranging in such a positional relationship, it is possible to ensure a position for the antenna AN where a metallic occluding object that would block electromagnetic waves has not been arranged in front of or above the antenna AN. Also, even for the sensing unit SN, it is possible to ensure a position where a metallic occluding object has not been arranged. Also, it is possible to suppress mutual interference of electromagnetic waves that can occur between the sensing unit SN and the antenna AN, and it becomes possible to ensure the communication performance of the antenna AN and the sensing performance of the sensing unit SN.

Detailed description will be omitted, but the straddle type vehicle 1 comprises an electric control unit (ECU) which includes a CPU and a memory (FIG. 4), and the electric control unit (ECU), based on information obtained by the antenna AN and the sensing unit SN, can perform reporting of periphery information to the rider and driving assistance control. The electric control unit (ECU) can perform some of the drive operations such as acceleration and braking of the vehicle, for example, in place of the rider as driving assistance control. Examples of this are vehicle speed maintenance travel control (auto cruise control (ACC)), traffic lane maintenance travel control (lane keep assist (LKAS)), and the like. Based on the information of the antenna AN and the sensing unit SN, in a case where an obstacle is sensed in front of the vehicle 1, it is possible to warn the rider with a notification display on the meter unit MU, for example.

Embodiment 2

Figure 7:
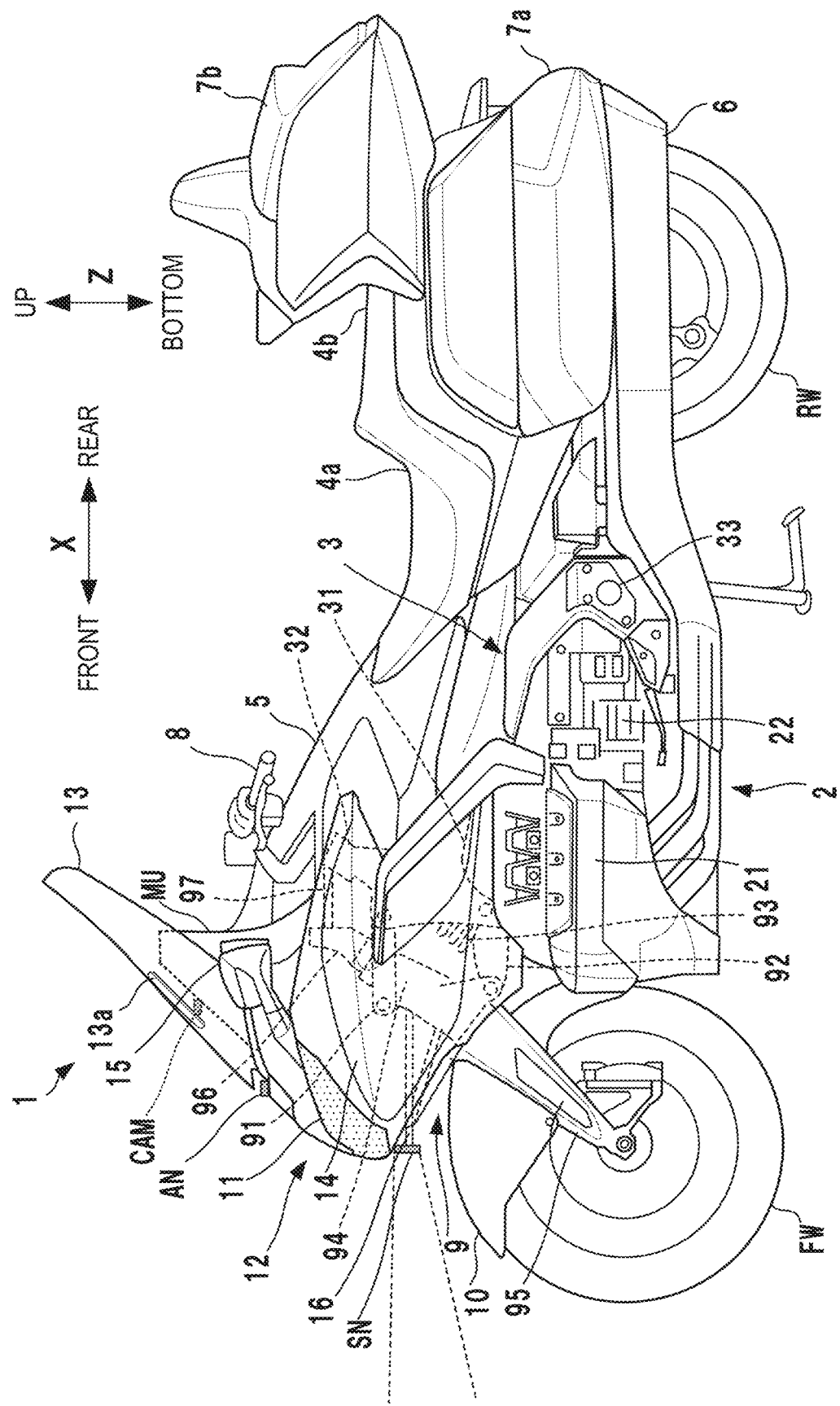
FIG. 7 is a left side view of a straddle type vehicle according to a second embodiment.
Figure 8:
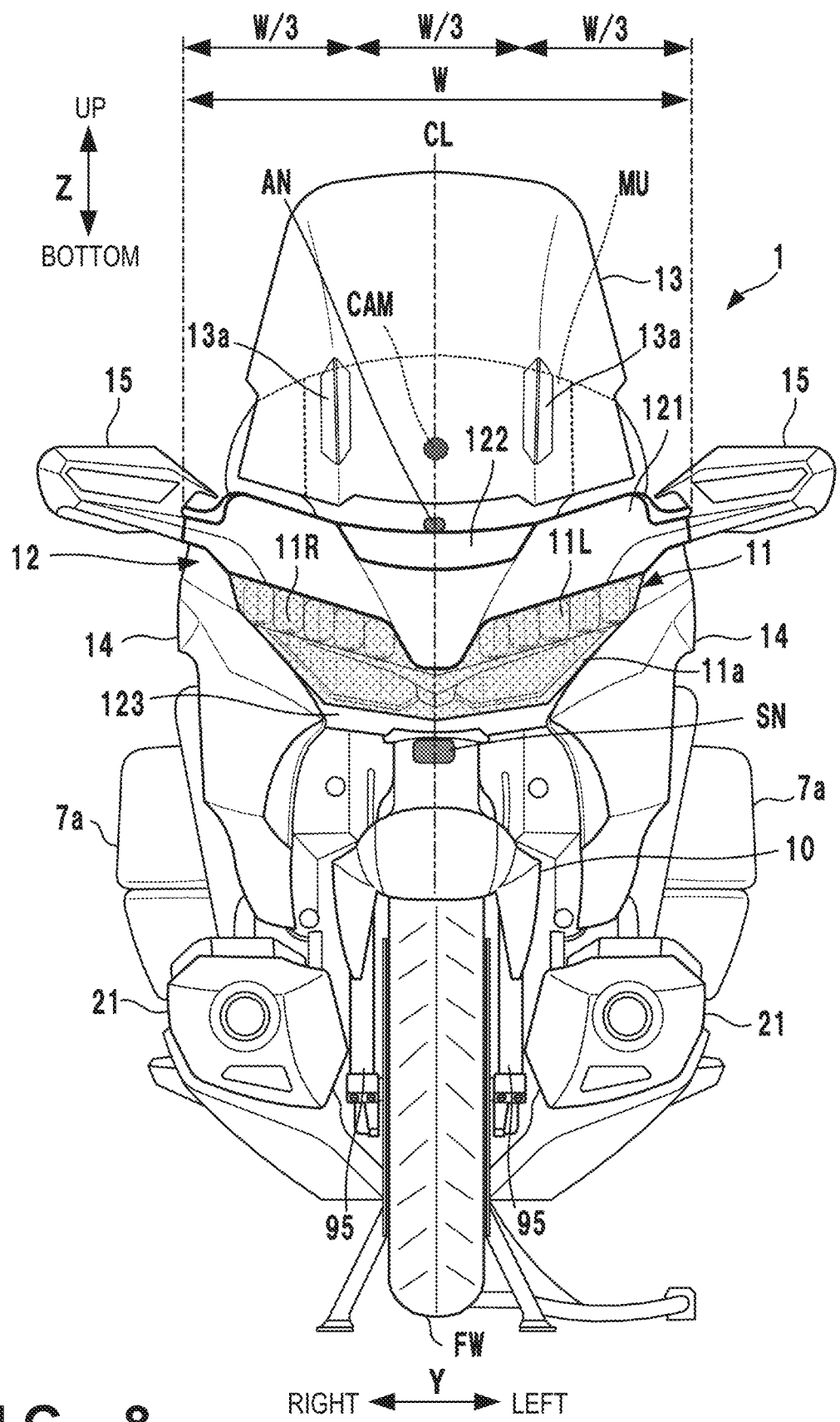
FIG. 8 is a front view of the straddle type vehicle shown in FIG. 7.
Figure 9:
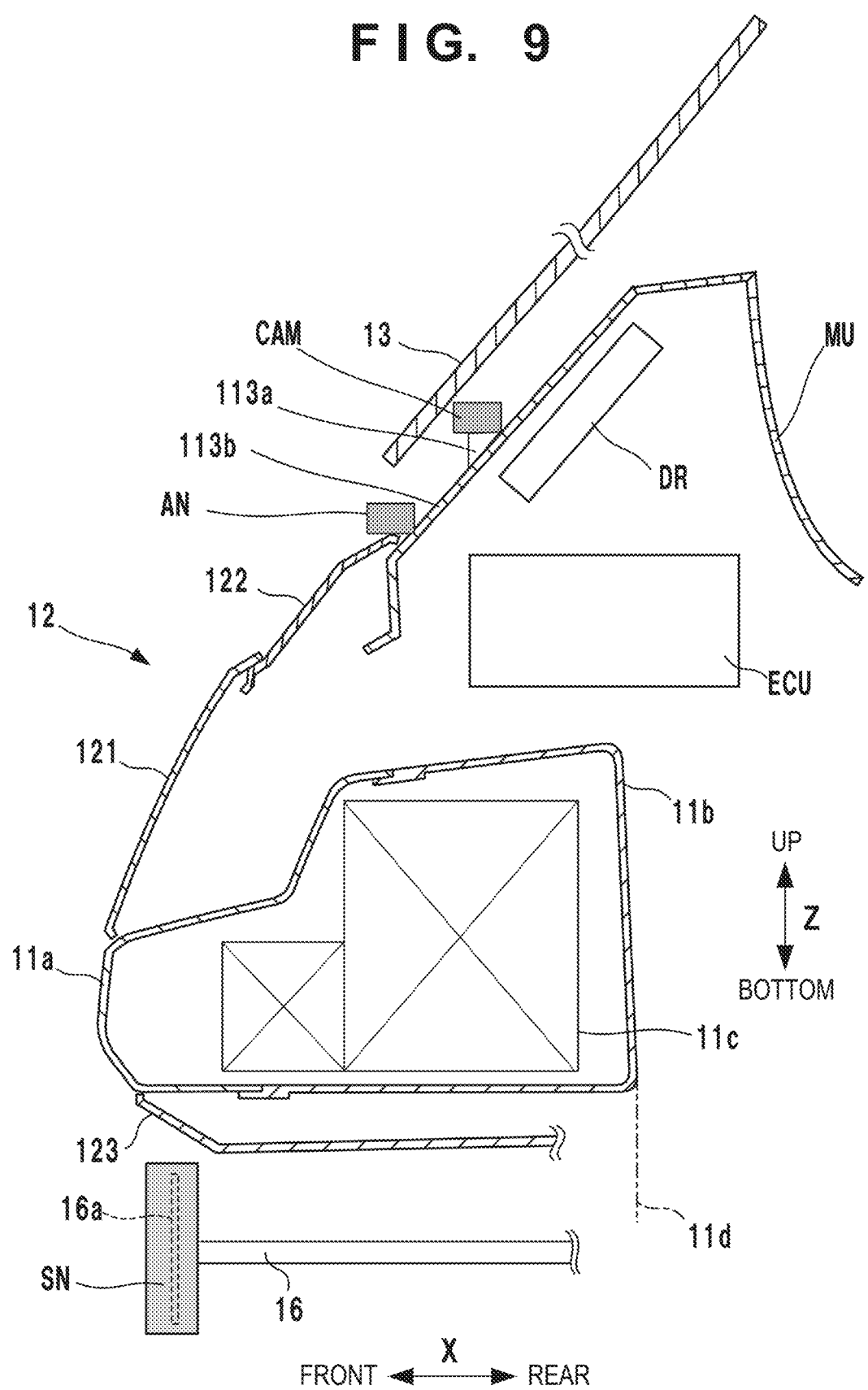
FIG. 9 is an overview cross-sectional view in a front structure of the straddle type vehicle according to the second embodiment.

In the above embodiment, an example in which the antenna AN is described as being arranged at an upper portion of the meter unit MU and an upper end portion of the screen stay 13a, but the antenna AN may be arranged at a position as much as possible to the front of the vehicle 1 and in the upwards direction of the vehicle 1 to not be influenced by metal occluding objects. FIG. 7 is a left side view of the straddle type vehicle according to a second embodiment, and FIG. 8 is a front view of the straddle type vehicle of FIG. 7. Also, FIG. 9 is an overview cross-sectional view in the front structure of the straddle type vehicle according to the second embodiment.

In this embodiment, the antenna AN is arranged at a position above the front cover 12 (the cowl member 122) where metallic occluding objects that would block electromagnetic waves have not been arranged in front or above the antenna AN. The sensing unit SN is arranged in the front direction and the downward direction of the vehicle 1 in relation to the antenna AN. Also, the sensing unit SN and the antenna AN are arranged in front of the support mechanisms (91 to 94) that support the front forks 95 of the vehicle 1 and the antenna AN is arranged above the headlight unit 11.

In the arrangement relationship of the antenna AN and the sensing unit SN illustrated in FIG. 7 to FIG. 9, when the front cover 12 (the cowl member 122) is assumed to be the constituent component of the vehicle, the antenna AN is arranged above the front cover 12, and the sensing unit SN is arranged below the front cover 12. Also, the sensing unit SN and the antenna AN are positioned at the front side in the longitudinal direction of a vehicle in relation to the rear end 11d of the headlight unit 11 of the vehicle 1.

By arranging the antenna AN in such a positional relationship, it is possible to ensure a position at which a metallic occluding object that would block electromagnetic waves in front of or above the antenna AN have not been arranged. Also, even for the sensing unit SN, it is possible to ensure a position at which a metallic occluding object has not been arranged.

Furthermore, since the sensing unit SN and the antenna AN are positioned more to the front side in the longitudinal direction of a vehicle (the X direction) than the rear end 11d of the headlight unit 11, it becomes possible to avoid electrical interference that can be generated with a metal part in the headlight unit 11 such as the reflectors 112R and 112L or the like to which a metal plating process is applied in the sensing range of the sensing unit SN and the communication range of the antenna AN.

Also, by arranging the front cover 12 of the vehicle 1 between the sensing unit SN and the antenna AN and separating the sensing unit SN and the antenna AN, it is possible to suppress electromagnetic wave mutual interference, and it becomes possible to ensure the communication performance of the antenna AN and the sensing performance of the sensing unit SN.

Summary of the Embodiments

The above embodiments disclose at least the following straddle type vehicle (vehicle).

Configuration 1. The straddle type vehicle (for example, 1) of the above embodiments comprise:
an antenna capable of receiving a wireless signal of a predetermined frequency band (for example, AN), and
a sensing unit for sensing a situation in a front direction of the vehicle (for example, SN),
wherein
a constituent component of the vehicle (1) is arranged between the antenna (AN) and the sensing unit (SN).

By virtue of Configuration 1, a straddle type vehicle in which an antenna and a sensing unit are arranged so that while according to the directionality of the antennas, the influence of metallic occluding objects is reduced, and electromagnetic wave interference is suppressed can be provided.

Also, it is possible to realize the arrangement and usage conditions of the antenna and the sensing unit, and provide a straddle type vehicle in which the antenna and the sensing unit are arranged such that it is possible to as much as possible enlarge the communication range of highly directional electromagnetic waves that are influenced by the peripheral situation.

Configuration 2. The straddle type vehicle (1) of the above embodiments further comprises a meter unit (for example, MU) arranged above the front cover (for example, 12, 121, 122, and 123) of the vehicle, wherein
the constituent component of the vehicle includes the meter unit (MU), and
the antenna (AN) is arranged above the meter unit (MU), and the sensing unit (SN) is arranged below the meter unit (MU).

By virtue of Configuration 2, by arranging the meter unit of the vehicle between the sensing unit and the antenna and therein separating the sensing unit and the antenna, it becomes possible to suppress mutual interference of electromagnetic waves, and it becomes possible to ensure the communication performance of the antenna and the sensing performance of the sensing unit.

Configuration 3. The straddle type vehicle (1) of the above embodiments further comprises the headlight unit (for example, 11) which emits light in the front direction of the vehicle, wherein
the constituent component of the vehicle includes the headlight unit (11), and
the antenna (AN) is arranged above the headlight unit (11), and the sensing unit (SN) is arranged below the headlight unit (11).

By virtue of Configuration 3, by arranging the headlight unit of the vehicle between the sensing unit and the antenna, and thereby separating the sensing unit and the antenna, it is possible to suppress mutual interference of electromagnetic waves, and it becomes possible to ensure the communication performance of the antenna and the sensing performance of the sensing unit.

Configuration 4. The straddle type vehicle (1) of the above embodiment further comprises a driving unit (for example, DR) for driving a screen (for example, 13) above the front cover (12, 121, 122, and 123) of the vehicle, wherein the constituent component of the vehicle includes the driving unit (DR), and the antenna (AN) is arranged above the driving unit (DR), and the sensing unit (SN) is arranged below the driving unit (DR).

By virtue of Configuration 4, by arranging the driving unit for driving the screen between the sensing unit and the antenna, and thereby separating the sensing unit and the antenna, it is possible to suppress mutual interference of electromagnetic waves, and it becomes possible to ensure the communication performance of the antenna and the sensing performance of the sensing unit.

Configuration 5. In the straddle type vehicle (1) of the above embodiment, the constituent component of the vehicle includes the front cover (for example, 12) of the vehicle, the antenna (AN) is arranged above the front cover (12), and the sensing unit (SN) is arranged below the front cover (12).

By virtue of Configuration 5, by arranging the front cover of the vehicle between the sensing unit and the antenna, and thereby separating the sensing unit and the antenna, it is possible to suppress mutual interference of electromagnetic waves, and it becomes possible to ensure the communication performance of the antenna and the sensing performance of the sensing unit.

Configuration 6. In the straddle type vehicle of the above embodiment, the sensing unit (SN) is arranged in the front direction and the downward direction of the vehicle (1) in relation to the antenna (AN).

Configuration 7. In the straddle type vehicle of the above embodiment, the sensing unit (SN) and the antenna (AN) are arranged in front of the support mechanism (91 to 94) that supports the front fork (for example, 95) of the vehicle (1), and the antenna (AN) is arranged above the headlight unit (11).

Configuration 8. In the straddle the vehicle (1) of the above embodiment, a camera (for example, CAM) for capturing the situation in the periphery of the vehicle (1) is further comprised, wherein the camera (CAM) is arranged between the sensing unit (SN) and the antenna (AN).

By virtue of Configurations 6 to 8, a straddle type vehicle in which antennas and a sensing unit are arranged so that while according to the directionality of the antennas, the influence of metallic occluding objects is reduced, and electromagnetic wave interference is suppressed can be provided.

Configuration 9. In the straddle type vehicle of the above embodiment, the sensing unit (SN) and the antenna (AN) are positioned on the front side in the longitudinal direction of a vehicle in relation to the rear end (for example, 11d) of the headlight unit (11) of the vehicle (1).

By virtue of Configuration 9, the sensing unit and the antenna are positioned on the front side in the X direction in relation to the rear end 11d of the headlight unit 11, and therefore it becomes possible to avoid electrical interference, in the sensing range of the sensing unit SN and the communication range of the antenna, that may occur with a metal part present in the headlight unit 11 such as the reflectors 112R and 112L and the like to which a metal plating process is applied.

Configuration 10. In the straddle type vehicle of the above embodiment, a vehicle body frame (for example, 3) including a main frame (for example, 31) that extends in the longitudinal direction of a vehicle is further comprised, wherein the sensing unit (SN) is supported by the main frame (31).

By virtue of Configuration 10, by the sensing unit being supported on a main frame that is of comparatively high rigidity within the vehicle constituent component, it is possible to improve the support rigidity of the sensing unit, and it is possible to suppress displacement of the sensing range due to use of the vehicle.

Configuration 11. In the straddle type vehicle of the above embodiment, the sensing unit (SN) is arranged to be separated from the lower end of the front cover (for example, 12 and 123).

By virtue of Configuration 11, by the sensing unit SN being arranged to be separated from the front cover 12 (the cowl member 123), vibration in the front cover 12 tends not to propagate to the sensing unit SN, and it is possible to prevent the mounting position of the sensing unit SN deviating due to vibration from the front cover 12 and prevent the orientation of the sensing surface changing.

The present invention is not limited to the above embodiments and various changes and modifications can be mace within the spirit and scope of the present invention. Therefore, to apprise the public of the scope of the present invention, the following claims are made.

What is claimed is:

1. A straddle riding vehicle, comprising:
an antenna capable of receiving a wireless signal of a predetermined frequency band;
a sensing unit for sensing a situation in a front direction of the vehicle, and
a driving unit for driving a screen arranged above a front cover of the vehicle,
wherein
a constituent component of the vehicle is arranged between the antenna and the sensing unit,
the sensing unit is supported by a main frame that extends in a longitudinal direction of a vehicle via a support stay, and is arranged more in the front direction of the vehicle than the antenna and the constituent component,
the constituent component of the vehicle includes the driving unit, and
the antenna is arranged above the driving unit, and the sensing unit is arranged below the driving unit.

2. The straddle riding vehicle according to claim 1, further comprising a meter unit arranged above the front cover of the vehicle, wherein
the constituent component of the vehicle includes the meter unit, and
the antenna is arranged above the meter unit, and the sensing unit is arranged below the meter unit.

3. The straddle riding vehicle according to claim 2, wherein the sensing unit is arranged so as to be separated from a lower end of the front cover.

4. The straddle riding vehicle according to claim 1, further comprising a headlight unit for emitting light in a front direction of the vehicle, wherein
the constituent component of the vehicle includes the headlight unit, and the antenna is arranged above the headlight unit and the sensing unit is arranged below the headlight unit.

5. The straddle riding vehicle according to claim 4, wherein
the constituent component of the vehicle includes a front cover of the vehicle, and
the antenna is arranged above the front cover, and the sensing unit is arranged below the front cover.

6. The straddle riding vehicle according to claim 5, wherein the sensing unit and the antenna are arranged in the front direction in relation to a support mechanism for supporting a front fork of the vehicle, and the antenna is arranged above the headlight unit.

7. The straddle riding vehicle according to claim 5, wherein the sensing unit and the antenna are positioned on a front side in a longitudinal direction of a vehicle in relation to a rear end of a headlight unit of the vehicle.

8. The straddle riding vehicle according to claim 1, wherein the sensing unit is arranged in the front direction and a downward direction of the vehicle in relation to the antenna.

9. The straddle riding vehicle according to claim 1, further comprising a camera for capturing a situation in a periphery of the vehicle, wherein
the camera is arranged between the sensing unit and the antenna.

* * * * *